(12) United States Patent
Choi

(10) Patent No.: US 6,795,418 B2
(45) Date of Patent: Sep. 21, 2004

(54) WIRELESS MAC PROTOCOL BASED ON A HYBRID COMBINATION OF SLOT ALLOCATION, TOKEN PASSING, AND POLLING FOR ISOCHRONOUS TRAFFIC

(75) Inventor: Sunghyun Choi, Montvale, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 866 days.

(21) Appl. No.: 09/732,585

(22) Filed: Dec. 8, 2000

(65) Prior Publication Data

US 2002/0071413 A1 Jun. 13, 2002

Related U.S. Application Data

(60) Provisional application No. 60/193,641, filed on Mar. 31, 2000.

(51) Int. Cl.⁷ .................................................. H04J 3/17
(52) U.S. Cl. ....................... 370/336; 370/338; 370/346; 370/468
(58) Field of Search ................................. 370/336, 337, 370/338, 349, 346, 347, 468

(56) References Cited

U.S. PATENT DOCUMENTS

| 5,684,791 A | 11/1997 | Raychaudhuri et al. ..... 370/278 |
| 2002/0141375 A1 * | 10/2002 | Choi .......................... 370/347 |
| 2004/0072573 A1 * | 4/2004 | Shvodian .................... 455/450 |

FOREIGN PATENT DOCUMENTS

EP    0483546a1    5/1992    .......... H04L/12/56

OTHER PUBLICATIONS

"Guaranteed Quality–of–Service Wireless Access to ATM Networks" by Cheng–Shang Chang et al., in IEEE Journal on Selected Areas in Communications, vol. 15, No. 1, Jan. 1997.

* cited by examiner

Primary Examiner—Melvin Marcelo
(74) Attorney, Agent, or Firm—John F. Vodopia

(57) ABSTRACT

In this document, we proposed a hybrid MAC protocol that can utilize the precious wireless link bandwidth efficiently in the environment of a partially connected wireless network topology and VBR connections running in the network.

4 Claims, 6 Drawing Sheets

WIRELESS MAC PROTOCOL BASED ON A HYBRID COMBINATION OF SLOT ALLOCATION, TOKEN PASSING, AND POLLING FOR ISOCHRONOUS TRAFFIC

This application claims the benefit of Provisional Application No. 60/193,641 filed Mar. 31, 2000.

BACKGROUND OF THE INVENTION

1. Field of the Invention

The present invention relates to a wireless medium access control (MAC) protocol, and more particularly relates to a hybrid wireless MAC protocol which uses a combination of slot (bandwidth) allocation, a variation on conventional token passing and polling for use in regulating isochronous traffic transmission.

2. Description of Related Art

The wireless communication market has lately enjoyed tremendous growth and is now capable of reaching every place on earth. Hundreds of millions of people exchange information every day using pagers, cellular telephones and other wireless communication products. Wireless communication has broken the harnesses of wireline networks, allowing users to access and share information on a global scale nearly everywhere they venture.

Standard LAN protocols (wireline), such as ETHERNET™, operate on wireline networks using various MAC protocols, e.g., carrier sense multiple access with collision detection (CSMA/CD), at fairly high speeds with inexpensive connection hardware which provides an ability to bring digital networking to practically any computer. Until recently, however, LANs were limited to physical, hard-wired (wireline) infrastructure. Even with phone dial-ups, network nodes were limited to access through wireline connections. Wireline communications, however, have set the stage for wireless communications.

Since the recent development of wireless LANs, many network users, such as mobile users in business, the medical professions, industry, universities, etc., have benefited from the enhanced communication ability of wireless LANs, i.e., increased mobility. Uses for wireless network access are practically unlimited. In addition to increased mobility, wireless LANs offer increased flexibility. Compared to wireline counterparts, however, wireless networks are known to have much less bandwidth, and hence it is highly desirable to utilize the wireless link bandwidth efficiently.

The IEEE standard for wireless LAN protocol is identified as "Standard for Information Technology-Telecommunications and information exchange between systems-Local and metropolitan area networks-Specific Requirements-Part 11: Wireless LAN Medium Access Control (MAC) and Physical Layer (PHY)," 1999, which will be referred to hereinafter as IEEE 802.11. IEEE 802.11 specifies parameters of both the physical (PHY) and medium access control (MAC) layers of the network. The PHY network handles transmission of data between nodes by either direct sequence spread spectrum, frequency-hopping spread spectrum, or infrared (IR) pulse position modulation. IEEE 802.11 makes provisions for data rates of either 1 Mbps or 2 Mbps, and calls for operation in the 4.4–2.4835 GHz band (spread spectrum), and 300–428,000 GHz for IR transmission.

In accordance with IEEE 802.11, there are two different ways to configure a network: ad-hoc and infrastructure. An example of an ad-hoc wireless network would include employees in various places using small computers and wireless links to implement an "ad-hoc" wireless network to facilitate the business meeting "on the fly". Such ad-hoc networks may be brought up and torn down in a very short time as needed, either around the conference table and/or around the world. In order to maintain such networks, algorithms such as the spokesman election algorithm (SEA) have been designed which "elect" one machine as the base station (master) of the ad-hoc wireless network, the remaining network members as slaves.

An example of an "infrastructure" wireless network under IEEE 802.11 uses fixed network access points with which mobile nodes can communicate. These network access points are sometimes connected to landlines to widen the LAN's capability by bridging wireless nodes to other wired nodes. If service areas overlap, handoffs can occur (which operation is very similar to conventional cellular technology). Regardless of the wireless LAN configuration, however, the WLAN still requires a medium access control protocol.

The MAC layer is a set of protocols which is responsible for maintaining order in the use of a shared medium. IEEE 802.11 specifies a carrier sense multiple access with collision avoidance (CSMA/CA) protocol for use as a random access protocol technique. Within such a network, when a node receives a packet to be transmitted, it first listens to ensure that no other node is transmitting. If the channel is clear (i.e., no other node is transmitting), the node then transmits the packet. Otherwise, the node chooses a random backoff factor which determines the amount of time the node must wait until it is allowed to retransmit the packet.

The reader should note, however, that collision detection, as is employed in ETHERNET™, cannot be used for the radio transmissions of IEEE 802.11 because transmitting nodes within the wireless LAN cannot hear any other node in the system (network) which may be transmitting. That is, the transmitting node's own signal is presumably stronger than any other signal arriving at the node. The problem can be analogized to the problem of hearing impairment, that is, some nodes are hearing impaired for any of various reasons.

Under IEEE 802.11, when a mobile wishes to transmit a packet, it may send out a short ready-to-send (RTS) packet containing information on the length of the packet. If the receiving node hears the RTS, it responds with a short clear-to-send (CTS) packet. The transmitting node sends its packet, and, when received successfully by the receiving node, the receiving node sends an acknowledgment (ACK) packet. Problems arise, however, with respect to those receiving nodes which are "hearing impaired".

Hidden nodes or stations (STAs) prevent efficient use of bandwidth as a result of their hearing impairment to certain transmissions. For example, FIG. 1 shows an example of a wireless local area network (WLAN) composed of an access point (AP) and a number of stations (STAs). WLAN operation therein is based on the premise that the AP can communicate with all STAs directly over the wireless link while STAs can communicate each other depending on the relative locations due to their limited transmission ranges.

In FIG. 1, STA 1 is seen as clearly able to communicate with STA 2 directly (or in one hop), but not with STA 3. In FIG. 1, a circle around each STA (and the AP) represents the corresponding transmission range, where STAs 1 and 3 are called hidden terminals to each other since they cannot know even the existence of each other without the help of the AP in between. Note that the communication between STAs 1 and 3 should be performed via the AP.

Various attempts have been made to utilize unused portions of TDMA time slots assigned to particular nodes within a WLAN, i.e., to implement channel efficiency. For example, Cheng-Shang Chang, et al., GUARENTEED QUALITY-OF-SERVICE WIRELESS ACCESS TO ATM NETWORKS, IEEE Journal on selected Areas In Communications, vol. 15, no. 1, January, 1997, discloses the use of polling in an effort to realize a protocol for non-preemptive priority for constant bit rate (CBR) and variable bit rate (VBR) traffic which supports ATM services.

U.S. Pat. No. 5,684,791 to Raychaudhuri, et al. (Raychaudhuri) discloses data link procedures for wireless ATM network channel access based on dynamic TDMA (time division multiple access)/TDD(time division duplexing) framework. The system provides ATM services such as ABR data and constant/variable (CBR/VBR) voice using wireless specific MAC and data link control (DLC) protocols. However, a reading of Raychaudhuri shows the complexity of its bi-component MAC protocol and operation.

OBJECTS AND SUMMARY OF THE INVENTION

It is therefore an object of the present invention to provide a wireless MAC protocol, and a wireless LAN system using the MAC protocol which overcomes the shortcomings of conventional methods of efficiently utilizing bandwidth.

It is also an object of the invention to provide a wireless MAC protocol for isochronous traffic support which utilizes the precious wireless link efficiently in a wireless network with hidden terminals.

To that end, the present invention sets forth a medium access control (MAC) protocol for Isochronous traffic support based on an implementation-dependent bandwidth-sharing algorithm. The MAC protocol includes three entities: (1) time slot allocation, which can be considered as the time unit in the underlying wireless network, and will be implementation specific, (2) token passing, which is not token passing as known in the art per se because there is no "real" token passed but a "virtual" token is passed, and (3) polling. Since Isochronous traffic requires guaranteed throughput and bounded latency, dynamic time division multiple access (TDMA)-like protocol is used to dynamically reserve bandwidth and allocate time slots to known STAs depending on their needs (demands).

A second embodiment of the invention embodies a wireless local area network (WLAN) which utilizes time slot allocation, virtual token passing and polling where necessary to maximize utilization of bandwidth. The WLAN operates in accordance with the limitations of a medium access control (MAC) protocol for utilization of allowable bandwidth in the WLAN operating at a variable bit rate (VBR) in isochronous transmission mode. The WLAN comprises an access point (AP) and a plurality of mobile stations (STAs), and the MAC protocol includes transmitting a beacon from the AP which includes time slot allocation information for each STA recognized by the AP, and AP information required for new STAs to join the network. The STAs will then transmit during its allocated transmission slot (in the order delegated by the AP). The MAC protocol allows a STA with a "subsequently" scheduled time slot to utilize any unused time in a time slot allocated to a "preceding" STA when the STA with the subsequently scheduled time slot within the transmission range of the preceding STA. The MAC also generates a polling mechanism at the AP directed to STAs with subsequently scheduled time slots in order to offer the STAs with subsequently scheduled time slots the preceding STA's remaining time (in its allocated time slot) when the preceding STA has clearly stopped transmitting, and before the time allocated for the subsequent STA to transmit.

BRIEF DESCRIPTION OF THE DRAWING FIGURES

DETAILED DESCRIPTION OF THE INVENTION

As mentioned herein, the invention comprises a media access control (MAC) protocol for isochronous traffic support. The invention utilizes a work frame which could be used in a conventional WLAN such as that shown in FIG. 1. The network frame starts with a beacon transmission from the access point (AP) to all the stations (STA) in the receiving range of the AP. The beacon includes the information about the time slot allocation for each STA, synchronization information and information about the AP itself, which is necessary for new STAs to associate with the AP.

Figure 2:
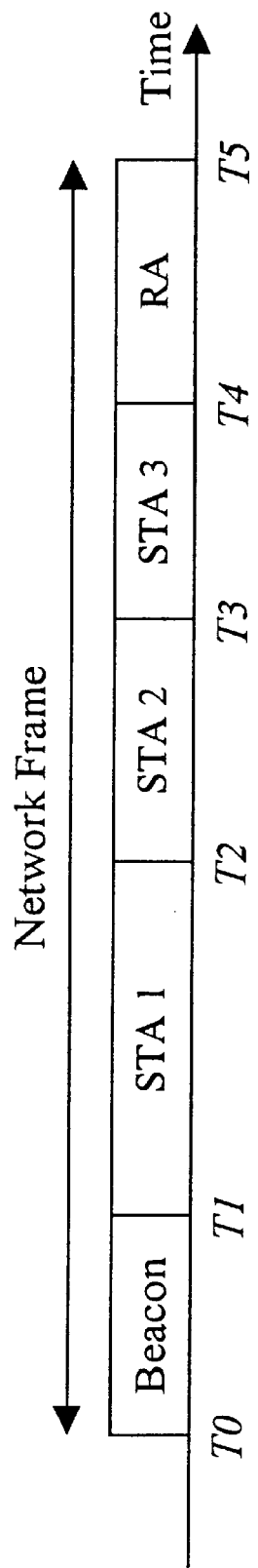
FIG. 2 is a timing diagram of a network frame for use in constant bit rate (CBR) configurations.

It must be assumed that within the WLAN of FIG. 2, all of the three STAs have constant bit rate (CBR) connections. Accordingly, the beacon informs the known STAs that time slot or duration (T1, T2) is for STA 1's transmission, (T2, T3) for STA 2's, (T3, T4) for STA 3's, and (T4, T5) for random access (RA). Each STA is able to begin transmitting its pending traffic at the beginning of the allocated time slots, and completes the transmissions at the end of the allocated time slots due to the nature of CBR (assuming, of course, that it has a full time slot's data to transmit).

During the RA period, STAs can request a new isochronous connection setup and also transmit asynchronous traffic based on a random access-based MAC protocol. For example, a carrier sense multiple access collision avoidance (CSMA/CA)-variant can be used, as in IEEE 802.11. Because the transmissions in the RA period can result in collisions for each successful isochronous connection setup request, the AP will perform an admission control in order to check if it is possible to support the requested connection without compromising the performance of the existing connections. If the connection is admitted, the AP will reserve some bandwidth for this connection within the RA period and will allocate time slots for the connection's STA beginning with the next network frame.

Some Isochronous connections may have variable bit rate (VBR) connections. When the AP reserves and allocates bandwidth to each connection or node based on the peak rate (or even based on the average rate), these connections may not use the allocated bandwidth fully. In this case, an implementation-dependent bandwidth-sharing algorithm of this invention utilizes a token passing mechanism to utilize the bandwidth efficiently. FIG. 3 shows an example when STA 1's connection is a VBR, and it finishes the transmission of its pending traffic earlier than time T2.

Figures 3A, 3B:
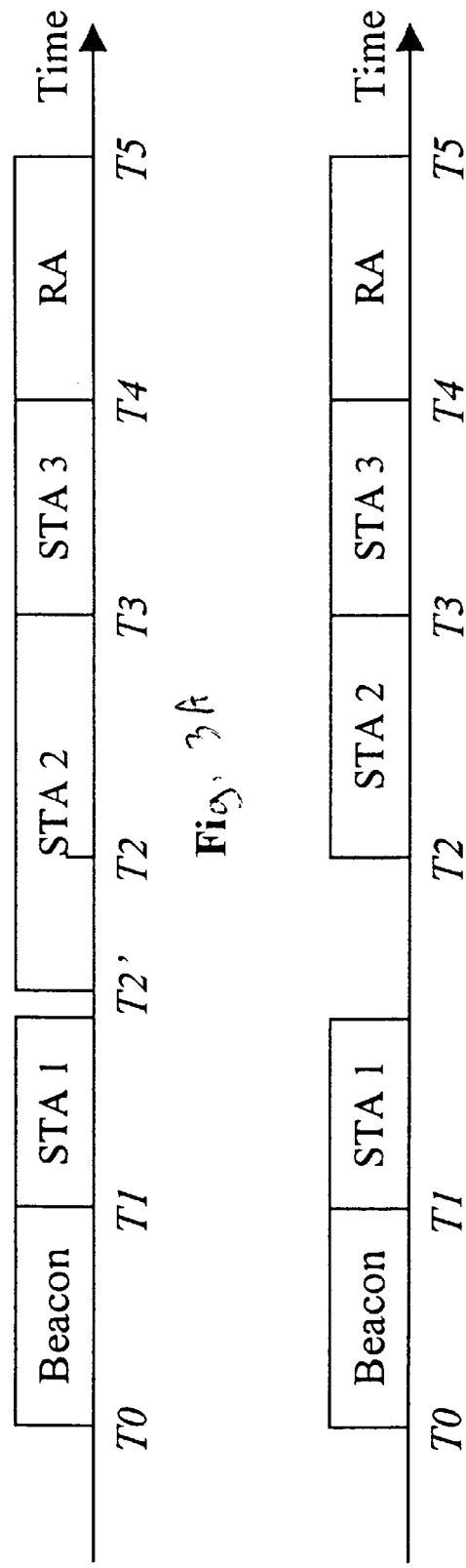
FIG. 3A is a timing diagram of a network frame for use in variable bit rate (VBR) connection of STA 1 when STA 2 hears STA 1's transmission.
FIG. 3B is a timing diagram of a network frame for use in variable bit rate (VBR) connection of STA 1 when STA 2 cannot hear STA 1's transmission.

Under circumstances where the link condition is good between STAs 1 and 2, by knowing that STA 1 is its predecessor, STA 2 could start transmitting its pending traffic at time T2' (<T2, which is the originally scheduled transmission start time) as shown in FIG. 3(A). That is, when STA 2 receives a "virtual" token from STA 1's transmission, e.g., EOF data, STA 2 knows from the virtual token that it may utilize the remainder of STA 1's unused time slot. This is implemented by the invention when STA 1 and STA 2 have a solid communication link, i.e., neither are hearing impaired.

Figure 1:
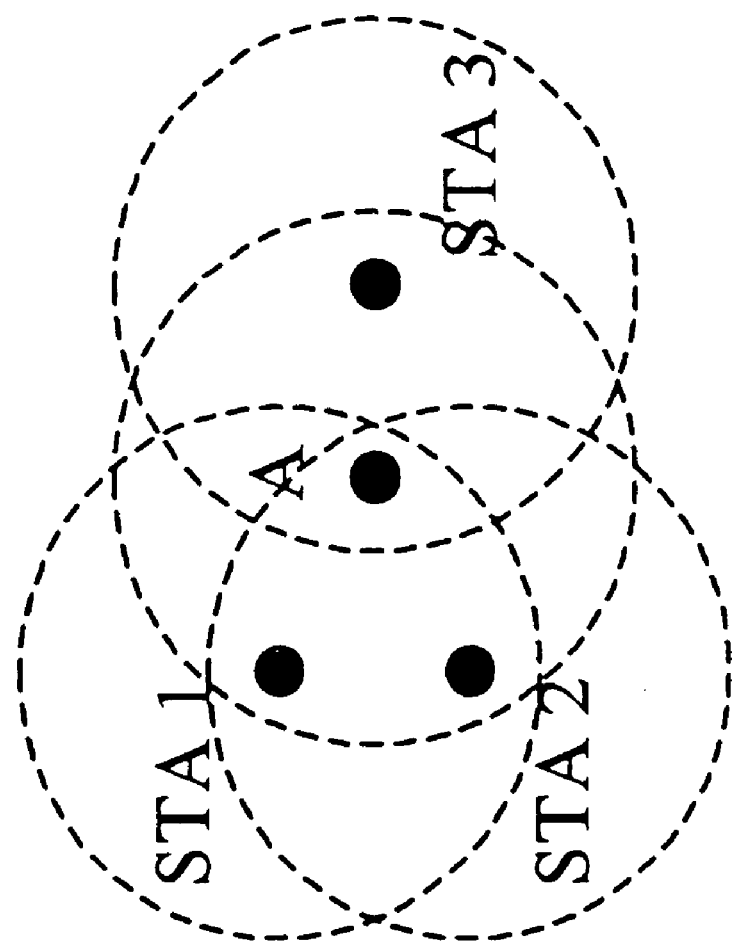
FIG. 1 is a schematic diagram depicting a conventional wireless network comprising stations which may be "hidden" from each other.

Note that there will be a small time gap between the transmission completion of STA 1 and transmission start of STA 2 since STA 2 needs to determine the STA 1's finish and switch to the transmission mode from the receiving mode. On the other hand, the time gap between STAs 1 and 2 in case of CBR can be virtually zero (as shown in FIG. 1). since the start time of STA 2 is assigned by the AP in advance. In fact, some guard time to handle the transmission delay differences between STAs 1 and 2 should be placed in the network frames, which is ignored in all the figures in this document for simplicity.

The FIG. 3(A) example (network frame) shows that STA 2 has used up the whole time from T2' to T3, so STA 3 just starts its transmission at T3 as originally scheduled. How to share the residual bandwidth, i.e., the time between T2' to T2, between STAs 2 and 3 can be determined either by STA 2 or the AP. If the AP determines the original bandwidth sharing policy, and the particulars of how to share. For example, is also conducted by the implementation-dependent bandwidth sharing algorithm.

WLAN implementation becomes problematic (as mentioned above) when the link condition is not good between STA 1 and STA 2 as shown in FIG. 3(B). Virtual token passing cannot be effective in this case because STA 2's obvious hearing impairment to STA 1. That is, STA 2 does not sense the transmission of STA 1, so STA 2 cannot determine when STA 1 finishes the transmission. STA 2 just starts its transmission at time T2 as scheduled without utilizing the unused portion of time slot (T1:T2). Depending on the bandwidth reservation/allocation, this situation can result in severe bandwidth under-utilization especially when connections' transmission bit rates fluctuate significantly. In the worse case, STA 1 may not transmit any packet at all in a network frame.

Figure 4:
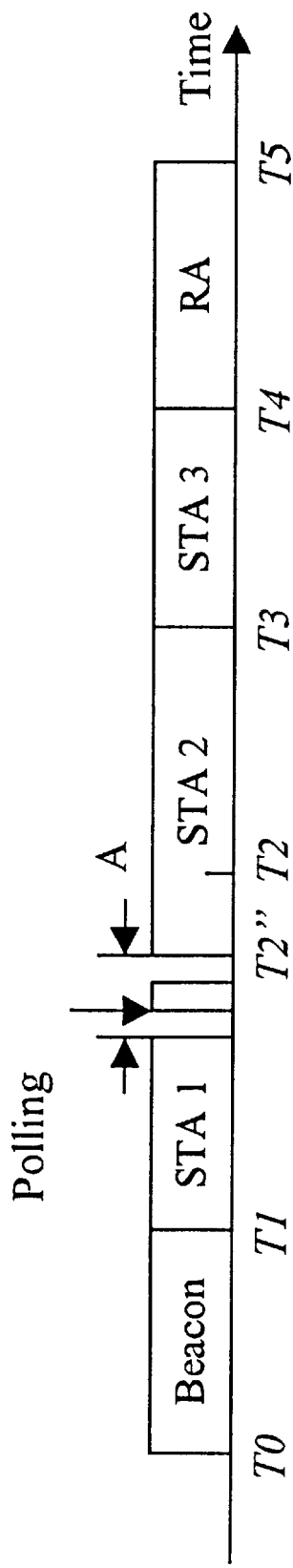
FIG. 4 is a timing diagram of a network frame for use in variable bit rate (VBR) connection of STA 1 when polling is used.

The polling mechanism of the present invention remedies the problem of hearing impairment between nodes in a WLAN to improve the channel utilization, as shown in the network frame of FIG. 4. When the algorithm determines that (1) STA 2 does not start transmission after STA 1's transmission completion, and (2) the estimated channel idle time till the scheduled transmission start time of STA 2 will be larger than the transmission of a polling packet (including the two time gaps), which is time A in the figure, the AP sends a polling packet to, for example, the following or subsequent node, or STA 2 in this case. Then, per being polled, STA 2 will start the transmission of its pending traffic. Without doubt, this polling mechanism can improve the link utilization significantly in case the link conditions between STAs are not good, and also in cases where the bit rates of connections fluctuate significantly.

The reader should note, however, that the use of polling should be kept to a minimum as the performance of token passing is superior to that of polling due to the polling overhead. Minimizing the use of polling is achieved by ordering the STA transmissions intelligently. For example, after determining that STA 2 cannot hear STA 1's transmission, the AP may want to swap the transmission order of STAs 2 and 3. Then, in the following network frame, STAs 1, 3, and 2 can be scheduled to transmit in order. If STA 3 happens to have a good link connection with STA 1, the link utilization can be improved by relying on token passing instead of polling.

Figure 5:
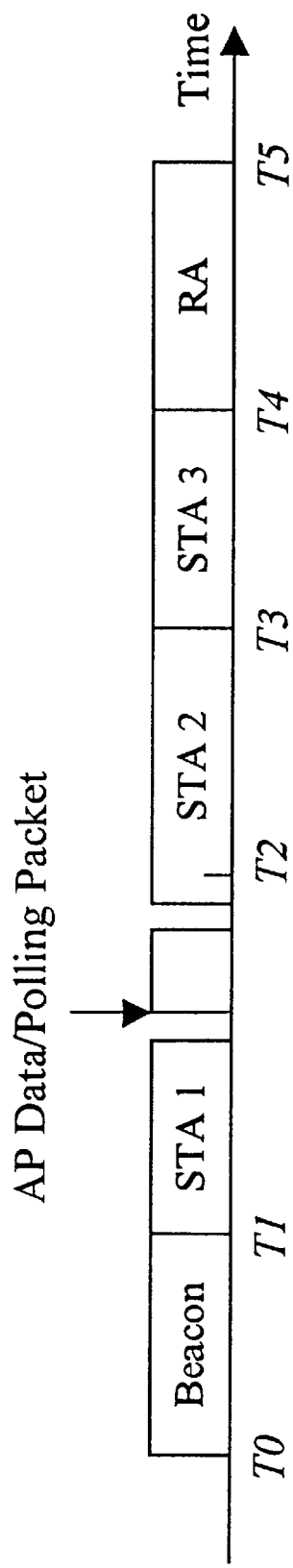
FIG. 5 is a timing diagram of a network frame for use in variable bit rate (VBR) connection of STA 1 when the AP transmits data frames piggybacked by the polling information for the residual bandwidth.

When the AP polls STA 2, a sub-portion of the portion of STA 1's unused time slot is used for polling, but realized is an availability of an unused portion of STA 1's slot from T2" to T2, as can be seen from the network frame of FIG. 4. Under circumstances where the AP may want to transmit its pending data piggybacked by the polling information, the network frame of FIG. 5 shows that this uses a larger amount of polling time resulting in less available transmission time for STA 2 within STA 1's unused slot portion. That is, an unused portion of timeslot (T1:T2) is utilized only if its pending data size is small enough to be finished by the originally scheduled transmission start time T2 of STA 2.

The polling information can be specified in the header of the transmitted frame. Note that in this manner, the overhead of polling can be significantly reduced. In IEEE 802.11, a similar mechanism is adopted as part of its polling mechanism, where the destination STA of the AP's data and the STA being polled should be the same. That is, the destination of the AP's data should be STA 2 (see the network frame depicted in FIG. 5) with the 802.11 standard. Actually, the stations do not need to be the same, but in that case, more information need to be specified in the header of the data frame to specify the STA being polled in addition to the destination of the data frame.

Figure 6:
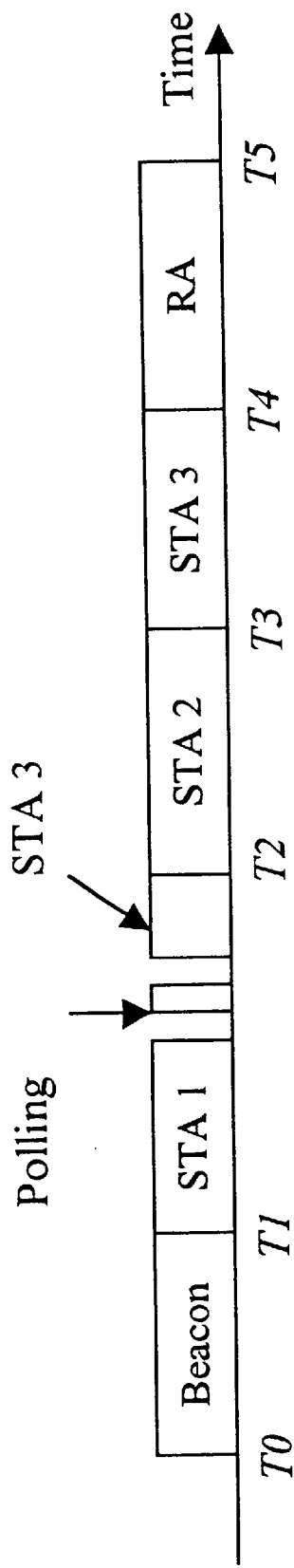
FIG. 6 is a timing diagram of a network frame for use in variable bit rate (VBR) connection of STA 1 when the AP polls STA 3 for the residual bandwidth.

There is another important scenario to be considered. For example, when the AP polls STA 2 as seen in the network frames of FIGS. 4 and 5, STA 2 may respond with a small packet which informs the AP that it does not have any pending packet data yet. However, it does not necessarily mean that STA 2 will not have any packet data to transmit in the network frame. That is, STA 2 may generate its Isochronous packets right before time T2, and should be able to transmit these packets in its reserved slots. So, the AP can utilize the residual bandwidth until the originally scheduled time T2 of STA 2, assuming STA 2 does not request it back. The AP can transmit another pending packet of which transmission can be finished by time T2, or it can poll another STA with the notification that the transmission should be finished by T2. Actually, the AP could want to poll another STA from the beginning instead of polling STA 2 or transmitting its own pending data, as shown in the network frame of FIG. 6. Note that in this case, the AP polls STA 3, and STA 3 finishes its transmission by time T2 so that STA 2 can fully utilize its allocated bandwidth.

The decision on whether to transmit its own data, poll STA 2 or poll another STA after determining a residual bandwidth is up to the adopted packet scheduling and bandwidth sharing algorithms, which are implementation-specific, as well as the priorities of the pending packets in the network, known to the AP.

What is claimed is:

1. A medium access control (MAC) protocol for maximizing utilization of allocable bandwidth in a wireless local area network (WLAN) in isochronous transmission mode, where the WLAN comprises an access point (AP) and a plurality of mobile stations (STAs), the MAC protocol including the steps of:

transmitting a beacon from the AP which includes time slot allocation information for each STA associated with the AP, and AP information required for new STAs to join the network;

transmitting by STAs in the order delegated by the AP;

allowing a STA with a "subsequently" scheduled time slot to utilize any unused time in a time slot allocated to a "preceding" STA when the STA with the subsequently scheduled time slot is within the transmission range of the preceding STA; and generating a polling mechanism at the AP directed to STAs with subsequently scheduled time slots in order to offer said STAs with subsequently scheduled time slots the preceding STA's remaining time (in its allocated time slot) when the preceding STA has clearly stopped transmitting, and before the time allocated for the subsequent STA to transmit.

2. The MAC protocol as defined by claim 1, wherein the step of transmitting includes the AP first generating and transmitting a beacon or header packet having a predetermined time slot in the network frame.

3. A wireless local area network (WLAN) which utilizes time slot allocation, virtual token passing and polling where necessary to maximize utilization of bandwidth, said WLAN operating in accordance with the limitations of a medium access control (MAC) protocol for utilization of allowable bandwidth in the WLAN operating at a variable bit rate (VBR) in isochronous transmission mode, where the WLAN comprises an access point (AP) and a plurality of mobile stations (STAs), the MAC protocol including the steps of:

transmitting a beacon from the AP which includes time slot allocation information for each STA recognized by the AP, and AP information required for new STAs to join the network;

transmitting by STAs in the order delegated by the AP;

allowing a STA with a "subsequently" scheduled time slot to utilize any unused time in a time slot allocated to a "preceding" STA when the STA with the subsequently scheduled time slot has a strong link to the preceding STA; and generating a polling mechanism at the AP directed to STAs with subsequently scheduled time slots in order to offer said STAs with subsequently scheduled time slots the preceding STA's remaining time (in its allocated time slot) when the preceding STA has clearly stopped transmitting, and before the time allocated for the subsequent STA to transmit.

4. A program storage device readable by a machine, tangibly embodying a program of instructions executable by the machine to perform method steps for which define a medium access control (MAC) protocol for maximizing utilization of allocable bandwidth in a wireless local area network (WLAN) in isochronous transmission mode, wherein the WLAN comprises an access point (AP) and a plurality of mobile stations (STAs), comprising the steps of:

transmitting a beacon from the AP which includes time slot allocation information for each STA associated with the AP, and AP information required for new STAs to join the network;

transmitting by STAs in the order delegated by the AP;

allowing a STA with a "subsequently" scheduled time slot to utilize any unused time in a time slot allocated to a "preceding" STA when the STA with the subsequently scheduled time slot within the transmission range of the preceding STA; and generating a polling mechanism at the AP directed to STAs with subsequently scheduled time slots in order to offer said STAs with subsequently scheduled time slots the preceding STA's remaining time (in its allocated time slot) when the preceding STA has clearly stopped transmitting, and before the time allocated for the subsequent STA to transmit.

* * * * *